United States Patent

Bohn et al.

(10) Patent No.: US 6,740,025 B2
(45) Date of Patent: May 25, 2004

(54) METHOD OF FOLDING A GAS BAG FOR A VEHICLE OCCUPANT RESTRAINT SYSTEM AND FOLDED GAS BAG

(75) Inventors: Stefan Bohn, Goldbach (DE); Joachim Fellhauer, Nilkheim (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 10/243,066

(22) Filed: Sep. 13, 2002

(65) Prior Publication Data

US 2003/0054933 A1 Mar. 20, 2003

(30) Foreign Application Priority Data

Sep. 14, 2001 (DE) .......................... 101 45 479

(51) Int. Cl.$^7$ .................................................. B31F 7/00
(52) U.S. Cl. ...................... 493/449; 493/250; 493/405; 493/451; 493/454; 493/941; 280/728.1; 280/743.1
(58) Field of Search ................. 493/250, 405, 493/409, 446–449, 451, 454–458, 463, 464, 941; 280/728.1, 728.2, 728.3, 731, 732, 743.1; 53/116, 117, 429, 438, 527, 528, 529, 530

(56) References Cited

U.S. PATENT DOCUMENTS

| 5,613,707 | A | * | 3/1997 | Berti ........................ 280/743.1 |
| 6,099,453 | A | * | 8/2000 | Bardroff ...................... 493/456 |
| 6,152,867 | A | * | 11/2000 | Heudorfer et al. ........... 493/451 |
| 6,250,676 | B1 | * | 6/2001 | Werstat et al. ............ 280/743.1 |
| 6,260,330 | B1 | * | 7/2001 | Borowski et al. ............. 53/429 |
| 6,305,150 | B1 | * | 10/2001 | Dietsch ........................ 53/529 |
| 6,485,403 | B2 | * | 11/2002 | Kamano et al. ............. 493/457 |
| 6,520,901 | B2 | * | 2/2003 | Nishijima et al. ........... 493/451 |
| 2002/0078664 | A1 | | 6/2002 | Arwood et al. |

FOREIGN PATENT DOCUMENTS

| DE | 19845721 A1 | 4/2000 |
| EP | 1179455 A2 | 2/2002 |
| EP | 1197401 A2 | 4/2002 |
| GB | 2342322 | 9/1999 |

* cited by examiner

Primary Examiner—Rinaldi I. Rada
Assistant Examiner—Hemant M Desai
(74) Attorney, Agent, or Firm—Tarolli, Sundheim, Covell & Tummino L.L.P.

(57) ABSTRACT

A method of folding a gas bag for a vehicle occupant restraint system comprises the following steps: first, the gas bag is unfolded between a base and an opposing surface. A spacing is provided between the base and the opposing surface, which corresponds to a height of a housing into which the gas bag is to be inserted after folding. Then, a folding funnel is provided which comprises one end having a large cross-section and one end having a small cross-section, the large cross-section being larger than or equal to a cross-section of the gas bag when unfolded between the base and the opposing surface, and the small cross-section corresponding to a cross-section of the housing; beginning with its large cross-section. Finally, the folding funnel is placed over the unfolded gas bag and moved relative thereto such that the gas bag is pushed together on the base by the folding funnel to the small cross-section.

13 Claims, 2 Drawing Sheets

METHOD OF FOLDING A GAS BAG FOR A VEHICLE OCCUPANT RESTRAINT SYSTEM AND FOLDED GAS BAG

TECHNICAL FIELD

The invention relates to a method of folding a gas bag for a vehicle occupant restraint system, as well as to a folded gas bag for a vehicle occupant restraint system.

BACKGROUND OF THE INVENTION

Numerous methods are known of translating a gas bag for vehicle occupant restraint system from an unfolded condition into a compact folded condition, in which the gas bag can be accommodated in a housing. In one known method fold tongues are used which are placed on the gas bag and form folding edges along which the gas bag can be folded together. Another known method uses pushers with which the gas bag is pushed together. The drawback of all these methods is the expense in being implemented.

The object of the invention consists in providing a method of folding a gas bag which can be implemented cost-effectively.

BRIEF SUMMARY OF THE INVENTION

According to the invention, a method of folding a gas bag comprises the following steps: firstly, the gas bag is unfolded between a base and an opposing surface, with a spacing being provided between the base and the opposing surface, this spacing corresponding to the height of a housing into which the gas bag is to be inserted after folding. Then, a folding funnel is provided which comprises one end having a large cross-section and one end having a small cross-section, the large cross-section being larger than or equal to a cross-section of the gas bag when unfolded between the base and the opposing surface, and the small cross-section corresponding to a cross-section of the housing. Finally, beginning with its large cross-section, the folding funnel is placed over the unfolded gas bag and moved relative thereto such that the gas bag is pushed together on the base by the folding funnel to the small cross-section. This folding method is thus based on pushing the gas bag together from the outside to the inside. Contrary to the pushers as known from prior art which are shifted in the same direction in which the gas bag is pushed together, the component, i.e. the folding funnel of the method according to the invention is slipped, so-to-speak, past the gas bag; the direction of movement of the folding funnel is roughly perpendicular to the direction in which the wall of the gas bag is pushed together. Due to the special cross-sectional shape of the folding funnel the wall of the gas bag is thereby pushed together from outside to the inside. The special advantage of this method lies in the fact that the gas bag is folded by a linear motion of one component only, namely the folding funnel. Such a motion is very easy to automate. Another advantage of the method according to the invention lies in the fact that practically any contour of the folded gas bag pack can be achieved by the corresponding shape of the small cross-section of the folding funnel at no extra expense whatsoever. When, for example, the housing for accommodating the gas bag has an oval cross-section, the folding funnel is configured with an oval small cross-section. In this way the gas bag is pushed together into a pack likewise having an oval cross-section.

A gas bag according to the invention that can be folded by the method according to the invention comprises a wall with a multitude of chaotically oriented single folds and an upper, substantially flat outer side and a lower, substantially flat outer side, with more single folds being provided in one of the outer sides than in the respective other outer side. This arrangement of single folds results from the relative movement between the folding funnel and the wall of the gas bag; corresponding to the direction of movement of the folding funnel the wall is shifted more strongly to the front outer side of the gas bag, as seen in the direction of movement of the folding funnel, so that the wall in this location becomes pleated.

Advantageous aspects of the invention will be apparent from the sub-claims.

DETAILED DESCRIPTION OF THE PREFERRED EMBODIMENTS

Figure 1:
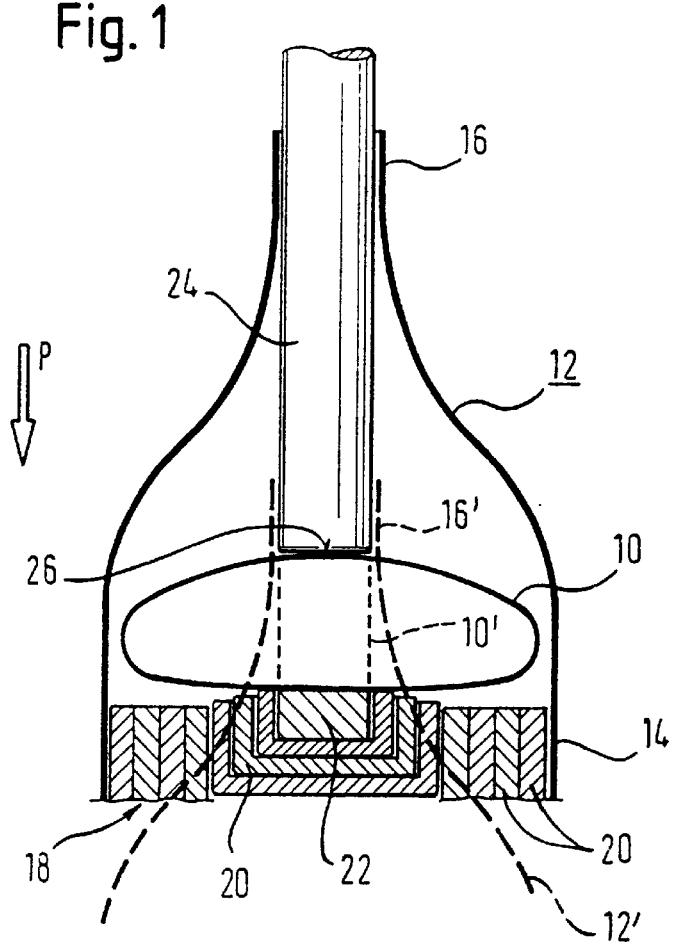
FIG. 1 is a diagrammatic view of a first folding machine, by means of which the gas bag according to a first embodiment of the invention can be pushed together.

Referring now to FIG. 1 there is illustrated a folding machine, by means of which a gas bag 10 can be pushed together by a method according to a first embodiment. The folding machine comprises a folding funnel 12 which in this case has the shape of a bottleneck and continually narrows from a large cross-section at a first end 14 of the folding funnel 12 to a second end 16 having a small cross-section. The folding funnel may be made of sheet metal or plastics and comprises a closed wall. The shape of the cross-section at the end 14 can be practically any; the folding funnel 12 in the simplest case having a circular cross-section at the first end 14. The shape of the cross-section at the second end 16 corresponds to the cross-sectional shape of a housing (not shown) into which the pushed-together gas bag is to be later inserted. The folding funnel 12 may, for example, have an oval cross-section at the second end 16. The folding funnel 12 is applied such that, starting from the location as shown in FIG. 1, it can be moved in the direction of the arrow P, i.e. downwards.

The folding machine comprises, in addition, a base 18 which in this case consists of several annular segments 20 and a middle section 22. The middle section 22 is fixedly secured in place whilst the segments 20 can be likewise moved in the direction of the arrow P, i.e. downwards. Provided on the middle section 22 is a clamping device (not shown) by means of which the gas bag 10 can be fixed. The clamping device may be formed by hooks which engage the inflation port of the gas bag and tighten the wall of the gas bag at the middle section 22. Provided furthermore at the middle section 22 is an inflating device (not shown) by means of which a slight overpressure can be built up in the interior of the gas bag 10.

The folding machine finally comprises a plunger 24, the end face of which forms an opposing surface 26 lying opposite the middle section 22 at a predefined spacing therefrom. This spacing corresponds to the height of the housing in which the folded gas bag is later to be accommodated. The cross-sectional shape of the plunger 24 corresponds to the cross-sectional shape of the second end 16 of the folding funnel 12, so that it serves as a guide therefor.

The gas bag 10 is pushed together as follows: firstly, the gas bag 10 is secured to the middle section 22, it then being unfolded by means of the inflating device into a shape which due to the opposing surface 26 lying opposite the middle section 22 is greatly oblate as compared to the freely deployed condition. The folding funnel 12 is then moved downwards in the direction of the arrow P, the inner surface area of the folding funnel engaging the gas bag and compacting it from outside to inside, i.e. in radial direction relative to the longitudinal centerline of the plunger 24. In the process, the segments 20 are drawn out downwards corresponding to the constriction of the cross-section of the folding funnel 12, so that they do not obstruct the downward shifting of the folding funnel 12, and the inflating device makes possible a controlled deflation of the gas bag. The gas bag 10 is fully pushed together to the shape 10' as shown by the broken line in FIG. 1 when the end 16 of the folding funnel is located in the region between the middle section 22 and the opposing surface 26 of the plunger (indicated as 16' by the broken line in FIG. 1).

Figure 2:
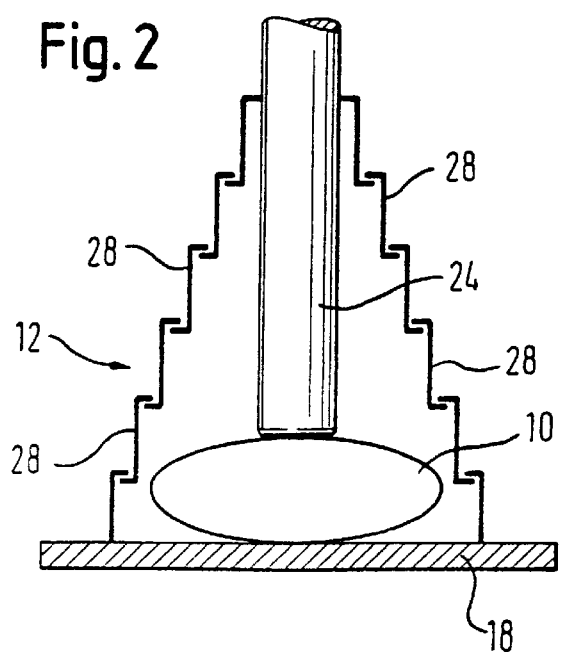
FIG. 2 is a diagrammatic view of a second folding machine, by means of which the gas bag according to a second embodiment of the invention can be pushed together.

Referring now to FIG. 2 there is illustrated a second folding machine by means of which a gas bag can be pushed together by a folding method according to a second embodiment. It is to be noted that like components are identified by like reference numerals as known from the first embodiment and reference is made to the above explanations.

Unlike the first embodiment, the base 18 in the second embodiment is configured as a rigid plate on which the gas bag 10 is unfolded, the folding funnel 12 now being composed of a plurality of rings 28 each attached to the other but movable relative to the other. Each ring 28 comprises at its upper end an inwardly bent rim and at its lower end an outwardly bent rim. The inwardly bent rim at the upper end of each ring 28 is located above the outwardly bent rim of the ring located thereabove. To compact the gas bag the folding funnel 12 is lowered downwards so that each ring comes into contact with the base 18 one after the other. In this arrangement, for each new ring coming into contact with the base 18 the wall of the gas bag 10 is urged somewhat furthermore inwards until the gas bag finally attains a cross-sectional shape conforming to the cross-sectional shape of the plunger 24.

Figure 3:
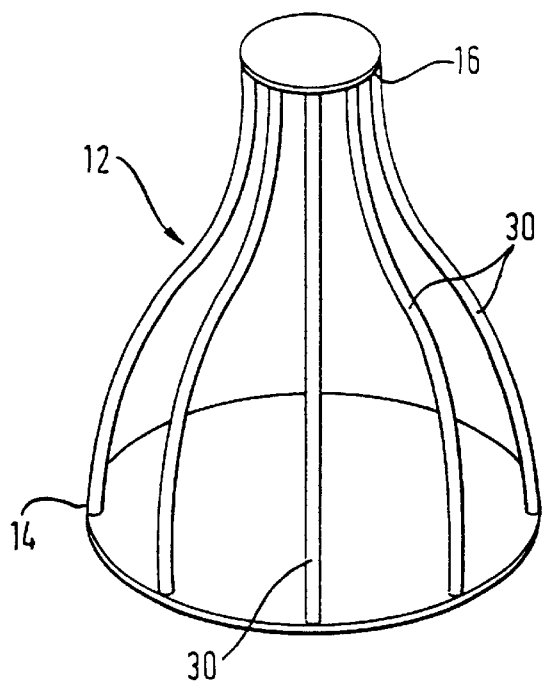
FIG. 3 is a diagrammatic view of a third folding machine, by means of which the gas bag according to a third embodiment of the invention can be pushed together.

Referring now to FIG. 3 there is illustrated a folding funnel for a third folding machine which similar to the embodiment as shown in FIG. 1 is shaped bottlenecked. In this case, however, the folding funnel has no sheet-like wall, it instead being formed by a plurality of juxtaposed rods 30 each connected to the other at the first end 14 and second end 16 of the folding funnel 12.

Figure 4:
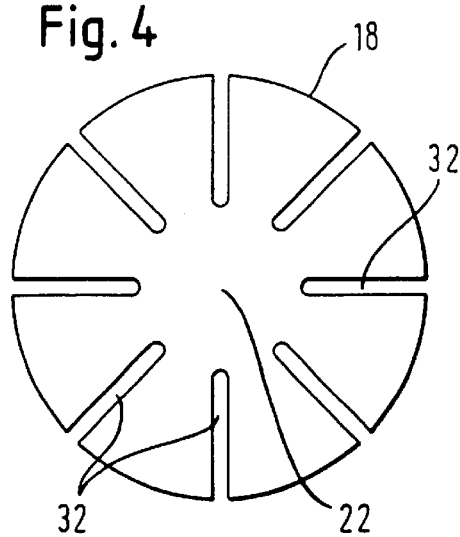
FIG. 4 is a plan view of a base as may be used in the folding machine as shown in FIG. 3.

Referring now to FIG. 4 there is illustrated the base 18 as used together with the folding funnel 12 as shown in FIG. 3. In this case, however, the base 18 consists of a plate in which several slots 32 are provided. The slots 32 are arranged and configured such that the rods 30 of the folding funnel 12 are able to enter into them.

To pack the gas bag it is first unfolded on the base 18, here too, use being made of an opposing plunger. Then, beginning with its first end 14 having the large cross-section the folding funnel 12 is placed over the base 18 and moved such that the rods 30 enter the slots 32 in forcing the gas bag inwards to the middle. The width of the slots 32 is dimensioned such that the wall of the gas bag cannot gain access to the slots 32 where it could become jammed with the rods 30. Apart from this, the spacing of the rods 30 from each other is dimensioned such that the gas bag is unable to yield outwards from the folding funnel.

Figure 5:
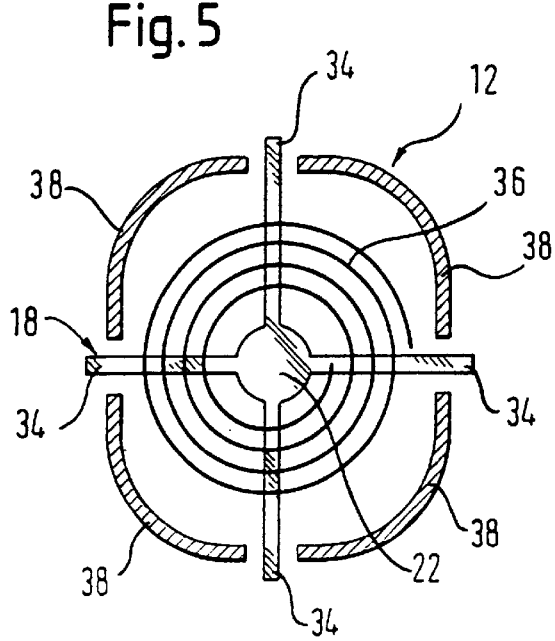
FIG. 5 is a cross-section view through a fourth folding machine, by means of which the gas bag according to a fourth embodiment of the invention can be pushed together.

Referring now to FIG. 5 there is illustrated in a diagrammatic section view a fourth folding machine, noting that this section is made radially relative to the longitudinal centerline of the plunger used and roughly in the region of the first end 14 of the folding funnel.

In this case, the base 18 comprises a middle section 22, from which four supporting webs 34 extend radially outwards. The base 18 comprises furthermore a coil spring 36 resting on the supporting webs 34.

The folding funnel 12, in this case, consists of four wall segments 38 arranged spaced away from each other such that a slot for passage of the supporting webs 34 is formed between them. Each of the wall segments 38 is oriented such that together they again form a bottleneck-shaped folding funnel.

The gas bag to be folded is applied to the middle section 22 and unfolded. The coil spring 36 resting on the supporting webs 34 serves as a lower support for the gas bag. Axially slipping the folding funnel over the base 18 causes the inner sides of the wall segments 38 to urge the wall of the gas bag inwards, the coil spring also being urged radially inwards so that it does not obstruct the folding funnel. The spacing of the coils of the coil spring and the slot between the wall segments 38 of the folding funnel 12 are dimensioned such that the gas bag cannot become jammed there.

Figure 6:
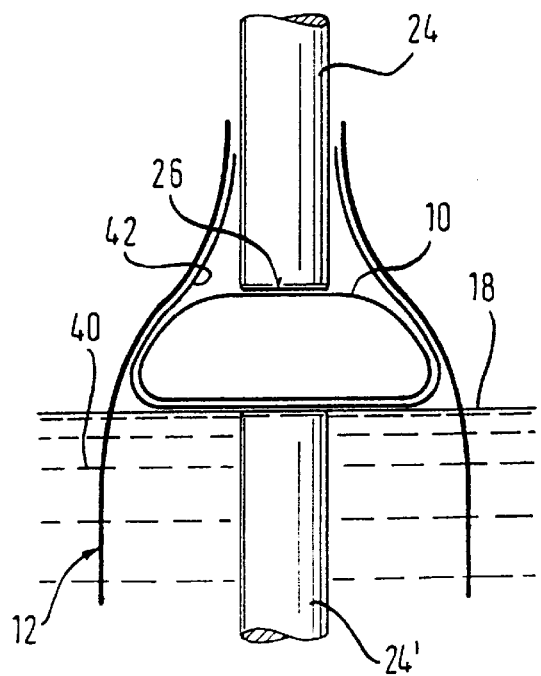
FIG. 6 is a diagrammatic view of a fifth folding machine, by means of which the gas bag according to a fifth embodiment of the invention can be pushed together.

Referring now to FIG. 6 there is illustrated a fifth folding machine, it using the same folding funnel 12 as the folding machine shown in FIG. 1. On this folding machine, however, the base 18 is formed by the surface of a liquid 40, for example, water. In this embodiment the gas bag is secured to the opposing surface 26 of the plunger 24, so that it unfolds between the surface 18 of the liquid 40 and the opposing surface 26. In this embodiment the folding funnel 12 simply dives into the liquid 40 when moved, whereas the gas bag 10, since it is filled with air, is prevented by its buoyancy from diving into the liquid 40; it instead being compressed radially from outside to the inside on the surface of the liquid 40 by the wall of the folding funnel 12. In this embodiment, before being unfolded, the gas bag is inserted into a packing envelope 42 extending within the folding funnel and between the surface 18 of the liquid 40 and the gas bag 10. Once the gas bag has been fully pushed together, the packing envelope can be closed off so that the gas bag is fixedly held in its folded condition.

Should the packing density become excessive, resulting in lack of buoyancy, an opposing plunger 24' of the same size as the plunger 24 may be present in the liquid, ending at the surface of the liquid. Where necessary, in this variant the plunger 24 may be lowered later than the folding funnel 12.

What is claimed is:

1. A method of folding a gas bag for a vehicle occupant restraint system, said method comprising the following steps:

said gas bag is unfolded between a base and an opposing surface, wherein a spacing is provided between said base and said opposing surface, said spacing corresponding to a height of a housing into which said gas bag is to be inserted after folding;

a folding funnel is provided which comprises one end having a large cross-section and one end having a small cross-section, said large cross-section being larger than or equal to a cross-section of said gas bag when unfolded between said base and said opposing surface, and said small cross-section corresponding to a cross-section of said housing;

beginning with its large cross-section, said folding funnel is placed over said unfolded gas bag and moved relative thereto such that said gas bag is pushed together on said base by said folding funnel to said small cross-section.

2. The method as set forth in claim 1, wherein said opposing surface has a shape corresponding to a cross-sectional shape of said housing.

3. The method as set forth in claim 1, wherein said base comprises a middle section, the shape of which corresponds to said cross-sectional shape of said housing.

4. The method as set forth in claim 1, wherein said base is formed by a bottom consisting of several segments that are removed corresponding to a reduction in said cross-section of said folding funnel.

5. The method as set forth in claim 1, wherein said base is formed on a coil spring which is pushed together corresponding to a reduction in said cross-section of said folding funnel.

6. The method as set forth in claim 1, wherein said base is formed by a surface of a liquid.

7. The method as set forth in claim 1, wherein said base is provided with slots extending up to a middle section.

8. The method as set forth claim 1, wherein said folding funnel is continuously tapered, starting from its large cross-section.

9. The method as set forth in claim 1, wherein said folding funnel is tapered step-wise, starting from its large cross-section.

10. The method as set forth claim 1, wherein said folding funnel comprises a closed wall.

11. The method as set forth in claim 1, wherein said folding funnel is formed by a plurality of juxtaposed rods.

12. The method as set forth in claim 1, wherein said folding funnel is formed by a plurality of juxtaposed wall segments between which a gap is provided.

13. The method as set forth claim 1, wherein said gas bag has a wall and is surrounded by a packing envelope extending between said wall and said folding funnel.

* * * * *